J. M. SAILER.
HITCH OR DRAFT DEVICE.
APPLICATION FILED NOV. 28, 1910.
1,044,581.
Patented Nov. 19, 1912.
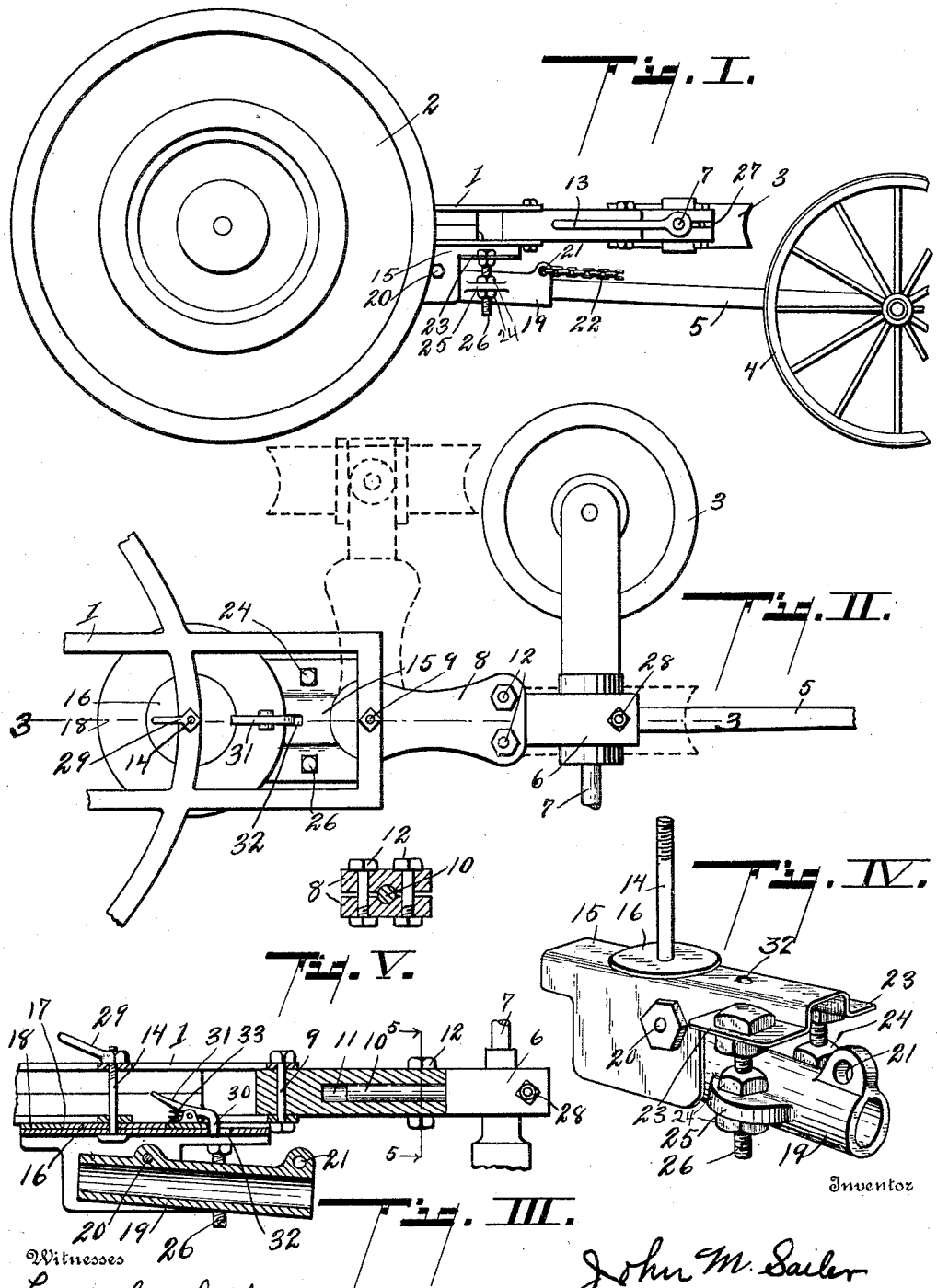

UNITED STATES PATENT OFFICE.

JOHN M. SAILER, OF JANESVILLE, WISCONSIN.

HITCH OR DRAFT DEVICE.

1,044,581.  Specification of Letters Patent.  Patented Nov. 19, 1912.

Original application filed July 15, 1910, Serial No. 572,157. Divided and this application filed November 28, 1910. Serial No. 594,499.

*To all whom it may concern:*

Be it known that I, JOHN M. SAILER, a citizen of the United States, residing at the city of Janesville, county of Rock, State of Wisconsin, have invented certain new and useful Improvements in Hitch or Draft Devices, of which the following is a specification.

This invention relates to improvements in hitch or draft devices.

My improved hitch or draft device is especially designed by me for use in connection with my improved traction engine illustrated in my application for Letters Patent, filed July 15, 1910, Ser. No. 572,157, of which application this present application is a division. It is, however, adapted for use in other relations.

The main objects of this invention are to provide an improved hitch or draft device which is adapted for use in connection with a wagon having a pivoted tongue,—that is, a tongue mounted on a horizontally-disposed pivot, such as is common in wagons, or for use with a wheeled truck having a rigid tongue or draw bar, or an implement such as a grain binder having a rigid tongue or drawbar.

Further objects, and objects relating to structural details, will definitely appear from the detailed description to follow.

I accomplish the objects of my invention by the device and means described in the following specification. The invention is clearly defined and pointed out in the claims.

A structure which is a preferred embodiment of my invention is clearly illustrated in the accompanying drawing, forming a part of this invention, in which:

Figure I is a detail side elevation of a structure embodying the features of my invention. Fig. II is an enlarged detail plan of the structure shown in Fig. I, the caster wheel being shown by full lines in its inoperative position, and being shown in two of its operative positions by dotted lines. Fig. III is an enlarged detail vertical section taken on a line corresponding to line 3—3 of Fig. II. Fig. IV is a perspective view of the draft pivot member and hitch member removed from the frame. Fig. V is a detail section taken on a line corresponding to line 5—5 of Fig. III, showing structural details of the caster wheel support.

In the drawing, similar reference characters refer to similar parts throughout the several views, and the sectional views are taken looking in the direction of the little arrows at the ends of the section lines.

Referring to the drawing, the frame 1 is shown largely in conventional form, as its structural details are not of importance in illustrating my present invention.

I have shown my invention as embodied in my improved traction engine illustrated in my application for Letters Patent hereinbefore referred to. The engine proper or motor is not shown.

The frame 1 is carried by the traction wheels 2 and by the caster wheel 3, when the engine is used for hauling an implement or vehicle having a pivoted tongue, or it may be carried by the traction wheels 2 and the wheels 4 of a vehicle or implement, as the case may be, when the same has a rigid tongue or draw bar. In the structure illustrated, the tongue 5 is a rigid or unpivoted tongue or draw bar, the draw bar and wheels being shown conventionally, as I deem that sufficient to illustrate my improvements.

The traction wheels 2 are steering wheels, that is, they are mounted to be adjusted on vertically disposed pivots, so that they may be adjusted to guide the engine. The construction is preferably that described and claimed in my said application, although the features of the present invention are capable of use with other constructions.

To adapt the structure for use as a hauling engine for various styles of vehicles and implements and for other purposes as occasion may require, the support for the caster wheel 3 is made adjustable so that it may be swung to its inoperative position, as shown in full lines in Figs. I and II, or it may be adjusted to one side of the hitch or draft device, as shown by dotted lines in Fig. II, or to a central position, as shown in such figure.

The means for supporting the caster wheel to permit this adjustment consists of the bearing 6 for the vertical supporting spindle 7, the bearing being supported by the arm 8 which is secured to the running-gear frame by the vertical pivot 9, the vertical pivot being provided with a nut so that the arm may be clamped in its adjusted positions, either in the position indicated by full lines in Figs. I and II, or in the lateral position shown by the dotted lines in Fig. II.

The bearing 6 is supported in this arm by means of the horizontally-disposed pivot 10, see Fig. III, which is arranged in a suitable socket 11 in the arm. The arm 8 is slotted and provided with clamping bolts 12, as shown in Fig. V, to permit its being clamped upon the pivot 10. The bearing is preferably slotted at 27 and provided with clamping bolts 28 so that the wheel support spindle may be clamped in the bearing, if desired. By this arrangement of the caster or third wheel, it can be used in its central position or adjusted to one side, as shown by dotted lines, or it can be swung out of operative position, as there illustrated, as conditions may require. The third wheel is provided with a lever 13, so that it may be used as a steering wheel, if desired.

My improved hitch or draft device comprises a draft pivot 14, arranged vertically in the frame 1. A draft pivot member 15, shaped like an inverted trough is mounted on the draft pivot, the member 15 being arranged on the underside of the frame. On this pivot member is a disk-like bearing plate 16 arranged in a suitable bearing 17 provided therefor in the plate-like bearing member 18, which is arranged on the under side of the frame, as is clearly shown in Fig. III. The hitch member 19 is tubular to receive a pole or draft bar, as 5. The hitch member is arranged between the sides of the draft pivot member and mounted on the horizontally-disposed pivot 20 carried thereby. The hitch member is provided with an eye 21 for the draft chain, as 22.

When the device is used in connection with a rigid tongued vehicle or implement, it is sometimes desirable to limit or prevent the vertical movement of the hitch member. I accomplish this by providing the draft pivot member 15 with lateral projections 23, by which the threaded rods 26 are carried. These threaded rods are arranged through laterally-projecting ears 25 on the hitch member and are provided with nuts 24 above and below these ears, which may be adjusted to clamp the ears, as shown in the drawing, or to permit a limited vertical movement of the hitch member on its pivot 20. These nuts may be adjusted to support the hitch device at the proper angle. The nut 29 for the draft pivot 14 is provided with a hand piece as shown, so that it may be readily adjusted to clamp the draft pivot member in a fixed position. The advantage of this is that when the engine is used for hauling an implement such as a grain binder or a two wheeled truck, the same may be more effectively steered or guided by the traction wheels. It is, however, sometimes desirable to allow the draft pivot member to swing in turning. To provide a means for automatically locking the draft pivot member, I provide a locking bolt 30 which is mounted on the lever 31, the lever 31 being mounted on the plate 18. The draft pivot member 15 is provided with a hole 32 for the locking bolt. The locking bolt is actuated by the spring 33. By my improvements I secure a hitch or draft device that is strong and simple in structure.

The engine may be connected to carry any kind of a load. If desired, the wheels of a truck or of the implement to which the engine is hitched may be made to serve as the rear support for the engine frame, so that the traction wheels form in effect the front steering wheels of a motor vehicle or implement, such as a grain binder or harvesting machine.

I have herein stated the various adjustments of my improved hitch device. I have illustrated and described my improvements in detail in a simple embodiment of the same, which will enable the ready understanding thereof. I have not, however, paid particular regard to proportions of the parts.

My invention is capable of various modifications in structural details, but as such modifications will no doubt be readily understood by those skilled in the art to which this invention relates, I have not attempted to illustrate or describe the same in detail herein.

Having thus described my invention, what I claim as new and desire to secure by Letters Patent is:

1. In a hitch device, the combination with the frame, of a vertically-disposed draft pivot; an inverted trough-shaped draft pivot member having laterally-projecting portions at its rear end; a disklike bearing plate for said draft pivot member arranged on the upper side thereof; a plate-like bearing for said bearing plate arranged on the under side of said frame; a hitch member adapted to receive a pole pivotally supported between the sides of said draft pivot member by a horizontally-disposed pivot, said hitch member being provided with laterally-projecting perforated ears; a pair of vertically-disposed threaded rods carried by said lateral projections of said draft pivot member arranged through said perforated ears of said hitch member; and nuts on said rods adapted to be adjusted to secure said hitch member against vertical movement on its pivot connection to said draft pivot member, or to permit a limited vertical movement thereof.

2. In a hitch device, the combination with the frame, of a vertically-disposed draft pivot; an inverted trough-shaped draft pivot member having laterally-projecting portions at its rear end; a hitch member adapted to receive a pole pivotally supported between the sides of said draft pivot member by a horizontally-disposed pivot, said hitch member being provided with laterally-projecting perforated ears; a pair of vertically-disposed threaded rods carried by said lateral projections of said draft pivot member arranged through said perforated ears of said hitch member; and nuts on said rods adapted to be adjusted to secure said hitch member against vertical movement on its pivot connection to said draft pivot member, or to permit a limited vertical movement thereof.

3. In a hitch device, the combination with the frame, of a vertically-disposed draft pivot; an inverted trough-shaped draft pivot member; a disklike bearing plate for said draft pivot member arranged on the upper side thereof; a plate-like bearing for said bearing plate arranged on the under side of said frame; a hitch member adapted to receive a pole pivotally supported between the sides of said draft pivot member by a horizontally-disposed pivot; and means for securing said hitch member against vertical movement on its pivot connection to said draft pivot member, or to permit a limited vertical movement thereof.

4. In a hitch device, the combination with the frame, of a vertically-disposed draft pivot; an inverted trough-shaped draft pivot member having laterally projecting portions at its rear end; a hitch member adapted to receive a pole pivotally supported between the sides of said draft pivot member by a horizontally-disposed pivot; and means for securing said hitch member against vertical movement on its pivot connection to said draft pivot member, or to permit a limited vertical movement thereof.

5. In a hitch device, the combination with the frame, of a vertically-disposed draft pivot; a draft member mounted on said pivot; a hitch member adapted to receive a pole connected to said draft pivot member by a horizontally-disposed pivot, said hitch member being provided with vertical openings; a pair of vertically-disposed threaded rods carried by said draft pivot member arranged through said openings; and nuts on said rods adapted to be adjusted to secure said hitch member against vertical movement on its pivot connection to said draft pivot member, or to permit a limited vertical movement thereof.

6. In a hitch device, the combination with the frame, of a vertically disposed draft pivot having a draft pivot member thereon; a hitch member adapted to receive a pole mounted on said draft pivot member by a horizontally disposed pivot; and means for securing said hitch member against vertical movement on its pivot connection to said draft member, or to permit a limited vertical movement thereof.

In witness whereof, I have hereunto set my hand and seal in the presence of two witnesses.

JOHN M. SAILER. [L. S.]

Witnesses:
JOHN CUNNINGHAM,
CORA M. O'BRIEN.